US012774756B2

(12) United States Patent
Wanner et al.

(10) Patent No.: US 12,774,756 B2
(45) Date of Patent: Oct. 27, 2026

(54) VALVE ASSEMBLY

(71) Applicant: ECO Holding 1 GmbH, Marktheidenfeld (DE)

(72) Inventors: Stephan Wanner, Biberach (DE); Max Podszun, Frickenhausen (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 19/250,634

(22) Filed: Jun. 26, 2025

(65) Prior Publication Data

US 2026/0002603 A1 Jan. 1, 2026

(30) Foreign Application Priority Data

Jun. 28, 2024 (DE) ........................ 102024118402.7

(51) Int. Cl.

| | |
|---|---|
| ***F16K 31/04*** | (2006.01) |
| ***F16K 1/02*** | (2006.01) |
| ***F16K 31/50*** | (2006.01) |
| *F16D 3/04* | (2006.01) |

(52) U.S. Cl.

CPC .............. *F16K 31/047* (2013.01); *F16K 1/02* (2013.01); *F16K 31/508* (2013.01); *F16D 3/04* (2013.01)

(58) Field of Classification Search

CPC ........ F16K 31/047; F16K 1/02; F16K 31/508; F16D 3/04

See application file for complete search history.

(56) References Cited

U.S. PATENT DOCUMENTS

| | | | | |
|---|---|---|---|---|
| 832,877 | A * | 10/1906 | Richards ............. | F16C 33/1065 384/291 |
| 2,756,573 | A | 7/1956 | Colby et al. | |
| 3,454,283 | A * | 7/1969 | Benjamin ............... | B23B 31/08 464/103 |
| 5,022,645 | A | 6/1991 | Green | |
| 6,257,987 | B1 * | 7/2001 | Lin ........................... | F16D 3/50 464/179 |
| 2017/0370493 | A1 | 12/2017 | Sigg et al. | |
| 2023/0063090 | A1 | 3/2023 | Maeder | |

FOREIGN PATENT DOCUMENTS

| | | | |
|---|---|---|---|
| DE | 102021122528 | B3 | 12/2022 |
| JP | 2021085477 | A | 6/2021 |

* cited by examiner

*Primary Examiner* — John Bastianelli

(74) *Attorney, Agent, or Firm* — Lerner David LLP

(57) ABSTRACT

A valve assembly with a drive unit which includes a rotor and a drive shaft, as well as a valve unit which includes a valve shaft and a closing body, wherein the drive shaft and the valve shaft are connected to one another by a coupling element in order to compensate for an axial and/or angular offset. The coupling element includes at least one transverse groove in which a transverse tongue of the drive shaft or of the valve shaft engages in a form-fitting manner, wherein a centering pin is formed on the transverse tongue and engages in an oblong hole for pre-centering, which is arranged in the transverse groove.

14 Claims, 2 Drawing Sheets

VALVE ASSEMBLY

CROSS-REFERENCE TO RELATED APPLICATIONS

The present application claims priority from German Application No. 10 2024 118411.6 filed Jun. 28, 2024, the disclosure of which is hereby incorporated herein by reference.

FIELD OF THE INVENTION

The invention relates to a valve assembly.

BACKGROUND OF THE INVENTION

Such a valve assembly is known, for example, from US 2017/0370493 A1.

The known valve assembly comprises a drive unit, which comprises an electromechanical actuator and a drive shaft. The drive shaft is coupled to a valve shaft of a valve unit. The coupling takes place via a so-called Oldham coupling, which permits a lateral offset of the drive shaft and the valve shaft. Such an Oldham coupling preferably comprises a transverse groove into which a transverse tongue engages. Specifically, in the known valve assembly, a transverse groove is provided in the valve shaft in which a transverse tongue of the drive shaft engages in a form-fitting manner.

A disadvantage of the known valve assembly is that, although a transverse displacement of the valve shaft with respect to the drive shaft is made possible, this takes place only in one direction. A dynamic adaptation of the position of the valve shaft and the drive shaft relative to one another is thus possible only to a limited extent. This can lead to stresses in the valve system, which results in an increase in the internal friction. This in turn leads to a loss of force at the sealing seat of a closing body, so that the tightness of the valve unit can be impaired. A further disadvantage can be seen in the fact that the assembly of the valve assembly is made more difficult, since an exact fitting of the transverse tongue into the transverse groove is necessary.

BRIEF SUMMARY OF THE INVENTION

Based on this background, an aspect of the invention may provide a valve assembly, which is improved with respect to the internal friction and in particular ensures a high tightness of the closing body in the sealing seat. Furthermore, the assembly of the valve assembly is to be made easier.

Thus, an aspect of the invention is based on the idea of providing a valve assembly with a drive unit, which comprises a rotor and a drive shaft. The valve assembly furthermore comprises a valve unit, which comprises a valve shaft and a closing body. The drive shaft and the valve shaft are connected to one another by a coupling element in order to compensate for an axial and/or angular offset. The coupling element comprises at least one transverse groove in which a transverse tongue of the drive shaft or of the valve shaft engages in a form-fitting manner. According to the invention, a centering pin is formed on the transverse tongue and engages in an oblong hole for pre-centering, which is arranged in the transverse groove.

An embodiment of the invention uses a preferably separate coupling element in order to compensate for an axial and/or angular offset between the drive shaft and the valve shaft. This increases the degrees of freedom in the relative movement between valve shaft and drive shaft. In this way, stresses are avoided and the internal friction in the valve assembly is reduced. This applies in particular to valve units in which the closing body is connected to the valve shaft via a thread, so that the closing body moves from the open position into the closed position parallel to the longitudinal axis of the valve shaft.

The coupling element is preferably arranged between the drive shaft and the valve shaft. In order to simplify the assembly, the centering pin can be provided to allow pre-centering. During the assembly of the valve assembly, the centering pin can thus first engage in an oblong hole which is arranged in the transverse groove of the coupling element. In this way, the coupling element is pre-centered with respect to the drive shaft or the valve shaft, which considerably facilitates the assembly. At the same time, the centering pin and the oblong hole limit the transverse movement of the coupling element along the transverse groove. In this way, the degree of compensation of the axial and/or angular offset can be set and controlled.

In a preferred embodiment of the valve assembly, it is provided that the coupling element comprises a drive-side transverse groove in which a drive-side transverse tongue of the drive shaft engages. Furthermore, the coupling element can comprise a valve-side transverse groove in which a valve-side transverse tongue of the valve shaft engages. In this way, the coupling element is of particularly simple structural design. In this way, the coupling element can be manufactured in a cost-effective manner.

The drive-side transverse groove and the valve-side transverse groove can be aligned perpendicularly to one another relative to a longitudinal axis direction of the valve shaft. In this way, it is ensured that an offset of the valve shaft relative to the drive shaft is possible in a plurality of spatial directions. Due to the perpendicular alignment of the two transverse grooves, displacements occurring dynamically in the rotational movement of the drive shaft can also be realized. This high degree of freedom makes it possible, in a particularly advantageous manner, to move the valve shaft with low friction, so that the efficiency of the valve assembly is increased. In particular, this provides positive effects on the dimensioning of the rotor and of a stator which can be electromagnetically coupled to the rotor and which, together with the rotor, forms a motor of the drive unit. In this way, the drive unit, in particular the motor, has to provide less power and can thus be designed in a particularly efficient manner.

The coupling element preferably forms a cross slide coupling. Such a cross slide coupling, which is also called an Oldham coupling, is a torsionally rigid coupling, which compensates for a radial offset between the valve shaft and the drive shaft. In this case, the cross slide coupling adapts dynamically to the external environmental conditions. Essentially, the cross slide coupling is therefore self-acting or self-regulating.

The centering pin is preferably formed on the valve shaft, in particular on the valve-side transverse tongue. In particular, the centering pin can be aligned coaxially to the valve shaft. It is preferred if the centering pin protrudes beyond the transverse tongue, in the axial direction.

During the assembly of the valve shaft, the centering pin can first engage in the valve-side transverse groove of the coupling element and then engage in the oblong hole formed in the transverse groove. In this way, a first guidance of the connecting movement or assembly movement is already ensured.

The transverse tongue can furthermore comprise a trapezoidal cross-sectional profile, whereby a further simplification of the assembly is achieved. Thanks to the trapezoidal cross-sectional profile, the transverse tongue can be introduced into the transverse groove in a particularly simple manner.

The oblong hole which is arranged in the transverse groove can be aligned perpendicularly to the transverse groove. In this case, the oblong hole can extend into sidewalls of the transverse groove. In particular, the oblong hole can be formed perpendicularly to the valve-side transverse groove. The oblong hole can also be formed as a through-opening, wherein the oblong hole is aligned perpendicularly to the valve-side transverse groove and parallel to the drive-side transverse groove.

In preferred embodiments, it can also be provided that the transverse groove comprises a trapezoidal cross-sectional contour, in particular complementary to the cross-sectional profile of the transverse tongue. This further simplifies the self-centering during assembly.

The transverse groove can comprise two sidewalls and a base, wherein the oblong hole is formed in the base. In particular, it can be provided that the oblong hole is formed as a through-opening in the coupling element. In this case, the oblong hole can connect the drive-side transverse groove and the valve-side transverse groove. Such a through-opening is particularly simple to realize in terms of production technology and reduces the costs of producing the coupling element.

The oblong hole can also be formed parallel to the valve-side transverse groove and perpendicularly to the drive-side transverse groove. In this case, the oblong hole can pass through the sidewalls of the drive-side transverse groove.

In further preferred embodiments of the invention, it can be provided that the drive-side transverse tongue is formed integrally with the drive shaft and/or the valve-side transverse tongue is formed integrally with the valve shaft. Such an integral formation of the transverse tongues increases the stability of the entire valve assembly, in particular of the drive train.

BRIEF DESCRIPTION OF THE DRAWINGS

The invention is explained in more detail below on the basis of an exemplary embodiment with reference to the attached schematic drawings. The drawings show.

DETAILED DESCRIPTION

Figure 1:
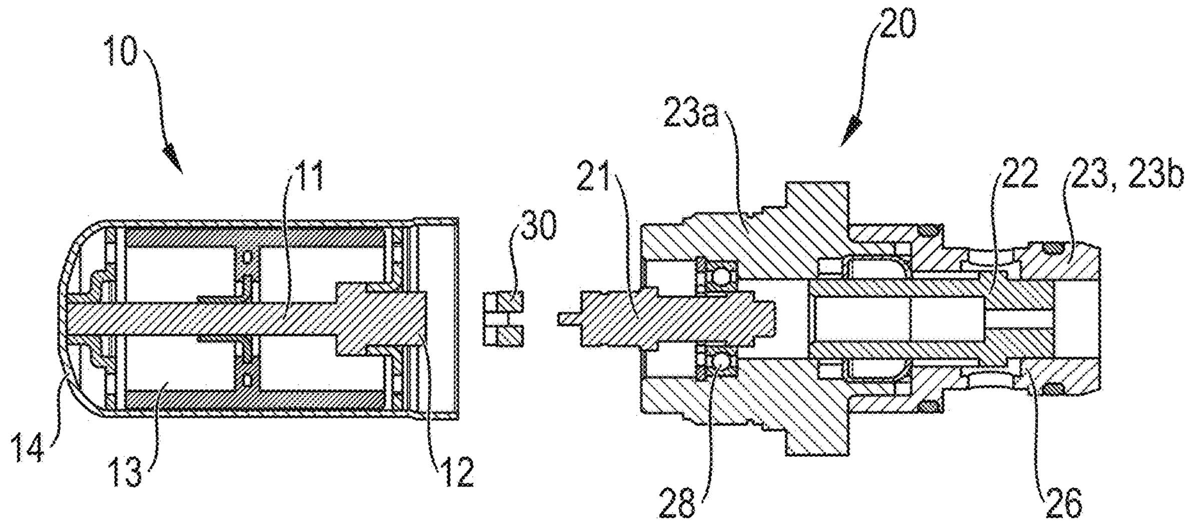
FIG. 1 a cross-sectional partially exploded view of the valve assembly according to the invention according to a preferred exemplary embodiment.

The valve assembly shown in FIG. 1 comprises a drive unit 10 and a valve unit 20. The drive unit 10 and the valve unit 20 are operatively connected to one another via a coupling element 30.

The drive unit 10 comprises a rotor 13, which is preferably part of an electric motor. The electric motor additionally comprises a stator (not shown) which is electromagnetically coupled to the rotor 13. The rotor 13 is arranged in a rotor sleeve 14, which hermetically or fluid-tightly separates the rotor 13 from the stator. The rotor 13 can comprise a plurality of permanent magnets, which are excited by electromagnetic coils of the stator and thus set the rotor 13 in a rotational movement. The electric motor can be a stepper motor, in particular.

The drive unit 10 further comprises a drive shaft 11, which is connected to the rotor 13 in a rotationally fixed manner. The drive shaft 11 extends through the rotor 13 and comprises a drive-side transverse tongue 12 at its valve-side end. The drive-side transverse tongue 12 is essentially formed as a projection, which protrudes beyond a preferably circular end surface of the drive shaft 11. The length of the drive-side projection 12 preferably corresponds to the diameter of the end surface.

The valve unit 20 comprises a valve shaft 21, which is mounted in a valve housing 23 via a rolling bearing 28, in particular a ball bearing. The valve housing 23 can be formed in multiple parts and in particular comprise a drive-side housing part **23*a* and a valve-side housing part 23*b***.

The drive-side housing part **23*a* and the valve-side housing part 23*b*** are preferably fixedly connected to one another, in particular in a materially bonded manner.

The valve unit 20 furthermore comprises a closing body 22, which is arranged in a linearly displaceable manner in the valve housing 23. The closing body 22 interacts with a valve seat 26, which is formed in the valve-side housing part **23*b* of the valve housing 23. In the closed position of the valve assembly, the closing body 22 bears in a sealing manner against the valve seat 26. In order to open the valve assembly or a fluid through-flow, the closing body 22 is displaced linearly in the direction of the drive unit, with the result that fluid can flow through between the closing body 22 and the valve 26. The closing body 22 is connected to the valve shaft 21. The connection preferably takes place via a thread, which converts a rotation of the valve shaft 21 into a linear movement of the closing body 22**.

Figure 2:
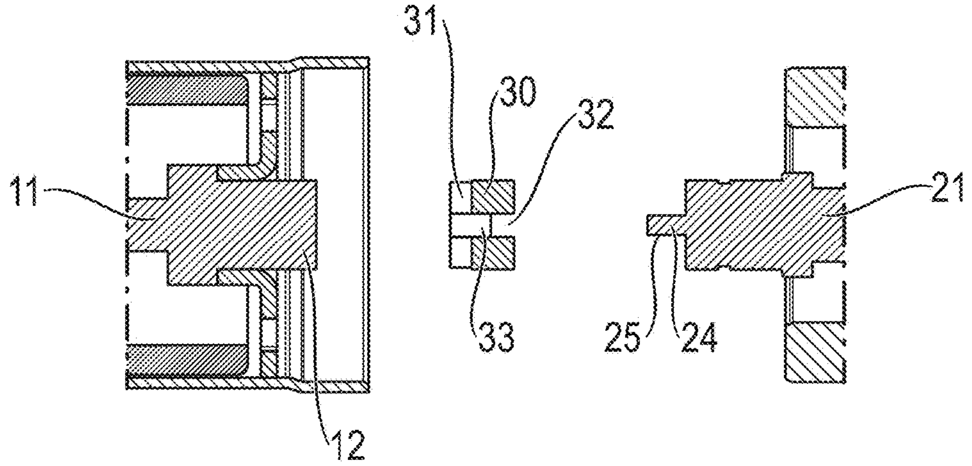
FIG. 2 a detailed view of the cross-sectional view according to FIG. 1.

The connection of the drive shaft 11 to the valve shaft 21 takes place via the coupling element 30. This is shown in greater detail in FIG. 2. The coupling element 30 comprises a drive-side transverse groove 31 into which the drive-side transverse tongue 12 can engage. The drive-side transverse groove 31 and the drive-side transverse tongue 12 are preferably shaped correspondingly to one another. In particular, the drive-side transverse tongue engages in a form-fitting manner in the drive-side transverse groove of the coupling element 30.

On a side facing the valve unit 20, the coupling element 30 comprises a valve-side transverse groove 32. The valve-side transverse groove 32 can be formed analogously to the drive-side transverse groove 31 with respect to its shape. However, the two transverse grooves 31, 32 differ in their orientation. In particular, the transverse grooves 31, 32 are aligned perpendicularly to one another. A valve-side transverse tongue 24 can engage in a form-fitting manner in the valve-side transverse groove 32.

The valve-side transverse tongue 24 is preferably formed as an extension on the valve shaft 21. In particular, the valve-side transverse tongue 24 can be formed as a projection beyond an end surface of the valve shaft 21. The end surface of the valve shaft 21 is preferably circular. The length of the valve-side transverse tongue 24 preferably corresponds to the diameter of the circular end surface of the valve shaft 21.

The coupling element 30 can comprise a circular outer contour. The diameter of the coupling element 30 preferably corresponds to the diameter of the end surfaces of the drive shaft 11 and the valve shaft 21. The transverse grooves 31,

32 preferably extend completely through the cross section of the coupling element 30. In particular, the transverse grooves 31, 32 extend radially through the coupling element 30.

Furthermore, an oblong hole 33 is formed in the coupling element 30. The oblong hole 33 preferably extends completely through the coupling element 30, i.e. is preferably formed as a through-opening. In this case, the oblong hole 33 connects the drive-side transverse groove 31 to the valve-side transverse groove 32.

The valve shaft 21 furthermore comprises a centering pin 25, which is formed on the valve-side transverse tongue 24. In particular, the centering pin 25 can be formed as a projection beyond the valve-side transverse tongue 24. The centering pin 25, the valve-side transverse tongue 24 and the valve shaft 21 are preferably formed in one piece or monolithically.

The centering pin 25 preferably comprises a cylindrical or frusto-conical shape. The diameter of the centering pin 25 is preferably dimensioned such that the centering pin 25 can be introduced easily into the oblong hole 33. In this case, there is preferably play on all sides between the centering pin 25 and the oblong hole 33.

Figure 3:
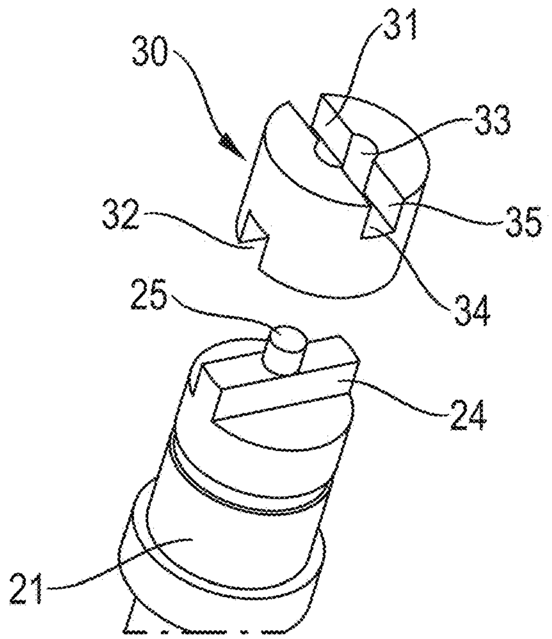
FIG. 3 a perspective view of the coupling element with the connection to the valve shaft of the valve assembly according to FIG. 1.

FIG. 3 shows in detail the drive shaft 21 with the valve-side transverse tongue 24 and the centering pin 25 formed on the valve-side transverse tongue 24. Furthermore, the coupling element 30 is shown, the valve-side transverse groove 23 of which can be connected in a form-fitting manner to the valve-side transverse tongue 24. The coupling element 30 comprises the drive-side transverse groove 31 on an opposite side. The drive-side transverse groove 31 comprises a base 34 and two sidewalls 35. The sidewalls 35 are interrupted by the oblong hole 33. Specifically, the oblong hole 33 can be formed in the coupling element 30 such that the oblong hole 33 is aligned with its long transverse axis parallel to the valve-side transverse groove 32. The width of the oblong hole 33 preferably corresponds to the width of the valve-side transverse groove 32. On the opposite side, the oblong hole 33 is aligned perpendicularly to the drive-side transverse groove 31. Since the length of the oblong hole 33 is greater than the width of the drive-side transverse groove 31, the oblong hole 33 passes through the sidewalls 35 of the drive-side transverse groove 31.

Figure 4:
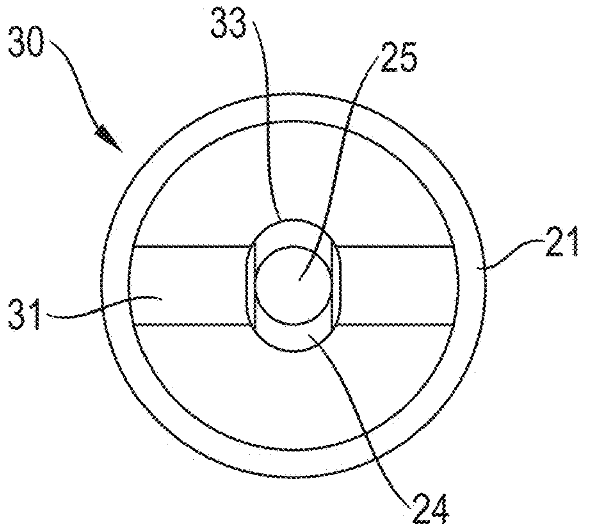
FIG. 4 a top view of the coupling element according to FIG. 3 connected to the valve shaft.

In the top view according to FIG. 4, it can be clearly seen that the centering pin 25 engages in a form-fitting manner in the oblong hole 33, wherein there is play on all sides between the centering pin 25 and the oblong hole 33. The centering pin thus makes it possible to achieve pre-centering during the assembly of the valve assembly. At the same time, the centering pin limits the relative movement between coupling element 30 and valve shaft 21. It can also be clearly seen in FIG. 4 that the oblong hole 33 is aligned perpendicularly to the drive-side transverse groove 31.

LIST OF REFERENCE NUMERALS

10 Drive unit
11 Drive shaft
12 Drive-side transverse tongue
13 Rotor
14 Rotor sleeve
20 Valve unit
21 Valve shaft
22 Closing body
23 Valve housing
23*a* Drive-side housing part
23*b* Valve-side housing part
24 Valve-side transverse tongue
25 Centering pin
26 Valve seat
27 Contact surface
28 Rolling bearing
30 Coupling element
31 Drive-side transverse groove
32 Valve-side transverse groove
33 Oblong hole
34 Base
35 Sidewall
L Longitudinal axis direction

What is claimed is:

1. A valve assembly with a drive unit comprising a rotor and a drive shaft, as well as a valve unit comprising a valve shaft and a closing body, wherein the drive shaft and the valve shaft are connected to one another by a coupling element in order to compensate for an axial and/or angular offset, wherein the coupling element comprises at least one transverse groove in which a transverse tongue of the drive shaft or of the valve shaft engages in a form-fitting manner, wherein a centering pin is formed on the transverse tongue and engages in an oblong hole for pre-centering, the oblong hole arranged in the transverse groove.

2. The valve assembly according to claim 1, wherein the coupling element comprises a drive-side transverse groove in which a drive-side transverse tongue of the drive shaft engages, and a valve-side transverse groove in which a valve-side transverse tongue of the valve shaft engages.

3. The valve assembly according to claim 2, wherein the drive-side transverse groove and the valve-side transverse groove are aligned perpendicularly to one another relative to a longitudinal axis direction (L) of the valve shaft.

4. The valve assembly according to claim 1, wherein the coupling element forms a cross slide coupling.

5. The valve assembly according to claim 1, wherein the centering pin is formed on the valve shaft or on the valve-side transverse tongue.

6. The valve assembly according to claim 1, wherein the centering pin is aligned coaxially to the valve shaft.

7. The valve assembly according to claim 1, wherein the centering pin protrudes beyond the transverse tongue, in the axial direction.

8. The valve assembly according to claim 1, wherein the transverse tongue comprises a trapezoidal cross-sectional profile.

9. The valve assembly according to claim 1, wherein the oblong hole is aligned perpendicularly to the transverse groove.

10. The valve assembly according to claim 1, wherein the transverse groove comprises a trapezoidal cross-sectional contour, or a cross-sectional contour complementary to the cross-sectional profile of the transverse tongue.

11. The valve assembly according to claim 1, wherein the transverse groove comprises first and second sidewalls and a base, and wherein the oblong hole is formed in the base.

12. The valve assembly according to claim 1, wherein the oblong hole is formed as a through-opening in the coupling element, or wherein the oblong hole connects the drive-side transverse groove and the valve-side transverse groove.

13. The valve assembly according to claim 2, wherein the oblong hole is formed parallel to the valve-side transverse groove and perpendicularly to the drive-side transverse groove, and wherein the oblong hole passes through the sidewalls of the drive-side transverse groove.

14. The valve assembly according to claim 2, wherein the drive-side transverse tongue is formed integrally with the drive shaft and/or the valve-side transverse tongue is formed integrally with the valve shaft.

* * * * *